June 2, 1959  C. W. BROEHL  2,889,097
AUTOMOBILE UTILITY DEVICE
Filed Aug. 30, 1957  2 Sheets-Sheet 1

INVENTOR.
Charles W. Broehl
By Mugen S Stone
Atty

June 2, 1959  C. W. BROEHL  2,889,097
AUTOMOBILE UTILITY DEVICE
Filed Aug. 30, 1957  2 Sheets-Sheet 2

INVENTOR.
Charles W. Broehl
BY
Atty.

2,889,097
AUTOMOBILE UTILITY DEVICE

Charles W. Broehl, Maywood, Ill.

Application August 30, 1957, Serial No. 681,283

4 Claims. (Cl. 224—42.42)

This invention relates to a combination protective cover and supporting table for use in the interior of an automobile, and including the employment of such in the rear floor or bed area of an automobile of the station wagon type.

It is an object of the invention to provide a utility device which will serve both to protect and safeguard articles stored or carried on the floor of an automobile and to make available a table or shelf surface for the storage of additional articles that are desired to be transported.

A further object of the invention is the provision of a protective cover for the rear floor area of an automobile which is employable as a shelf or table surface in the automobile and which is removable for use outside of and apart from the automobile as is so often desirable where the automobile is utilized as a means of transportation for camping, picnicking, and the like.

It is also a specific object of the invention to provide a utility device that is adjustable for use in automobiles having rear interior areas of varying dimensions as to width.

A still further object of the invention is the provision of a utility device which may be used as a combination protective cover and supporting surface, and which when not in use is adapted to be stored in the automobile without substantial interference with the original interior area of the automobile.

A more specific object of the invention is the provision of a protective cover extending across the interior area of an automobile below the window level so as to insure against harm by reason of theft or otherwise to articles contained in that portion of the automobile.

Further objects and advantages will be apparent from the particular details of construction and operation of the preferred embodiment of the invention as more fully hereinafter described and claimed, reference being had to accompanying drawings in which:

Figure 1:
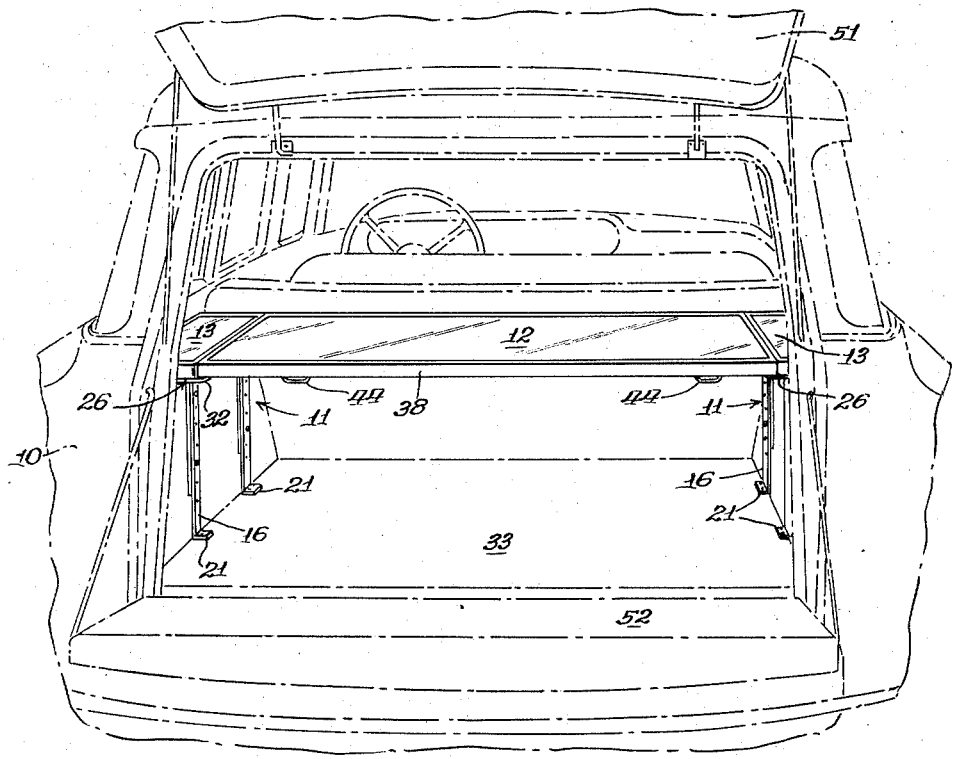
Figure 1 is a fragmentary, perspective view from the rear of a station wagon and depicting the utilty device embodying the invention in place for use as a combination protective cover and supporting surface.

Referring now to the drawings in detail wherein for the purpose of illustration I have disclosed a preferred embodiment of my invention, the numeral 10 depicts an automobile having assembled therewith the utility device to be hereinafter described.

The utility device is comprised essentially of a supporting surface 12 which extends between the sides of the automobile and is supported on the bracket assembly. An auxiliary surface 13 may be supported on each of the bracket assemblies 11 so that together they form complementary ends to the center surface 12 where such is desired. It should be noted that in this description and in the claims appended hereto the word "surface" is used to denote the strong and rigid plate or sheet that serves to provide simultaneously at either the center or sides a protective barrier between the lower portion of the automobile and supporting shelf or table for the holding of articles in the upper portion of the automobile. The elements herein referred to as "surfaces" possess, of course, both thickness and strength as well as length and width.

Figure 2:
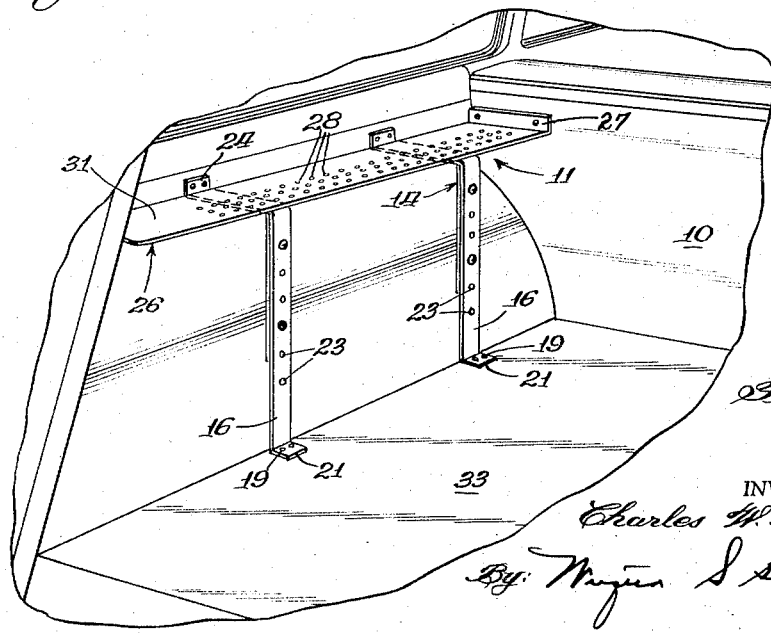
Figure 2 is a fragmentary, perspective view of a portion of the station wagon shown in Figure 1 and showing various of the supporting elements of the device.
Figure 3:
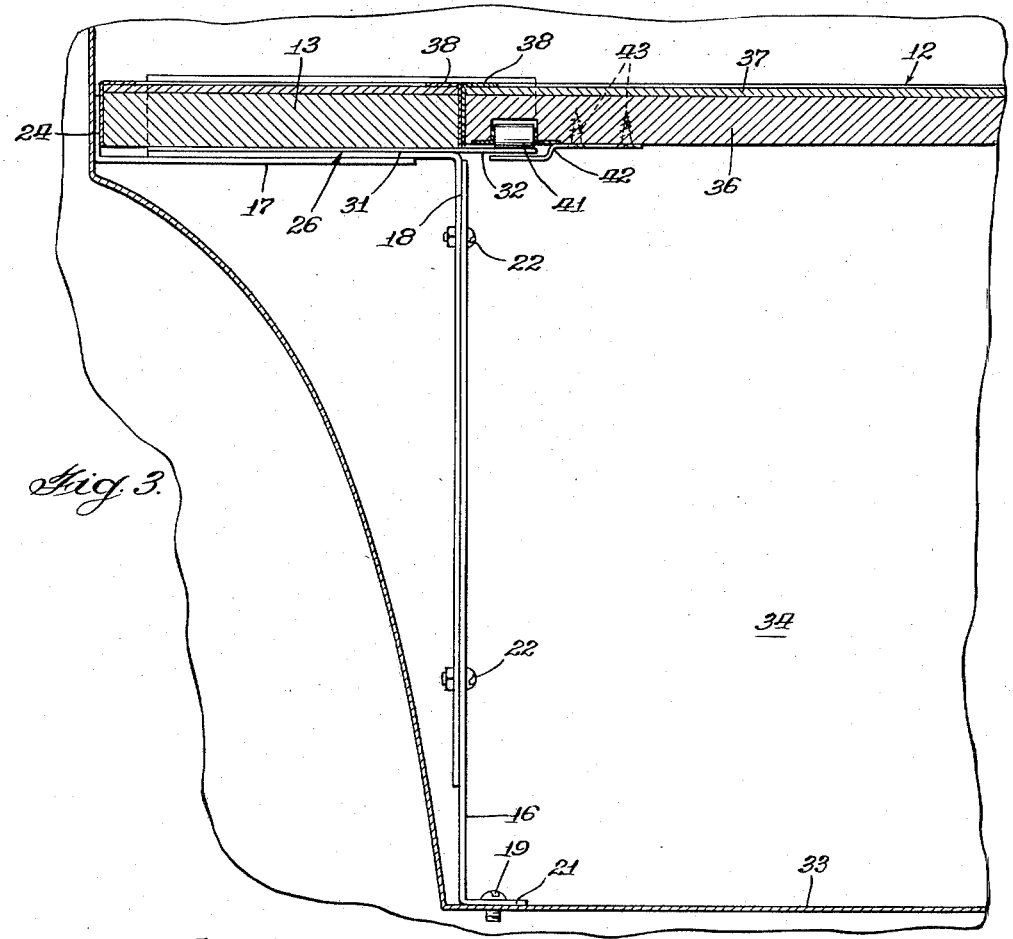
Figure 3 is a fragmentary, elevational view, in section, directed toward the front of the station wagon and enlarged to more clearly illustrate the engagement of various elements of the device with the station wagon.

As more clearly shown in Figures 2 and 3, the bracket assembly 11 that is used in the embodiment shown for support of the center surface 12, and the auxiliary surfaces 13 where such are used with the center surface, is comprised of two brackets 14 on each side of the automobile. Each of the brackets 14 includes a vertical member 16, a horizontal member 17, and a connecting member 18. The vertical member 16 is securely and rigidly attached to the automobile body at its lower end as by bolts 19 extending through a suitably formed flange 21 on the lower end of the vertical member. The connecting member 18 is secured to the vertical member by bolts 22 extending through one or more of the holes 23 formed in the vertical member. To enable the bracket assembly to be adjustable as to height, it is preferred that the holes 23 be somewhat closely spaced together in series throughout the center portion of the vertical member. Horizontal member 17 is attached to the automobile body as by bolting a flange 24 formed on the outer end of the member to the body. From such point of attachment, the horizontal member extends inwardly for engagement with the connecting member 18.

Extending along the sides of the automobile and supported on the brackets 14 is a supporting plate 26 having perpendicular end flanges 27 adapted to be secured to the automobile for additional support of the plate. A supporting plate 26 is positioned on the bracket 14 with a portion of the plate extending inwardly and beyond the vertical member 16 for purposes to be hereinafter described. The plate is bolted to either or both of brackets 14 by bolts (not shown) extending through one or more of the openings 28 provided in the plate. In many of the station wagon models of automobiles, the lower side portions in the rear of the automobile body are curved to provide fender wells. The bracket assembly that has been described is adapted for more or less universal application to automobiles of this type by reason of the adjustability of its component parts thereby enabling it to be suitably modified for attachment to automobiles of various makes and models.

Where the protective and supporting auxiliary surface 13 is to be used in the utility device, such surface is maintained on the supporting plate 26 along each side of the car, the surface projecting inwardly to the approximate point of vertical member 16. The auxiliary surface is attached to the plate as by wood screws (not shown) extending through holes 28 and into the underside of surface 13. As shown in Fig. 3, the plate 26 has an auxiliary supporting portion 31 which extends under the surface 13 and a center supporting portion 32 projecting inwardly beyond the inner edge of the auxiliary surface 13 to provide a supporting portion for the protective and supporting center surface 12.

Both the auxiliary and the center surfaces 12 and 13, respectively, are positioned in a plane substantially parallel to the automobile floor 33 and spaced therefrom to provide a protected compartment 34 wherein various articles being transported in the automobile may be safely stored. Both of such surfaces are formed of a strong and rigid material which will serve as a protective cover for the compartment 34 and also as a shelf or table for the carrying of articles thereon. A material satisfactory for the manufacture of the surfaces 12 and 13 is a combination of a plywood base 36 having a plastic top layer 37. Protection of the edges of the surfaces may be had by utilizing aluminum or stainless steel channels 38 for this purpose.

Figure 4:
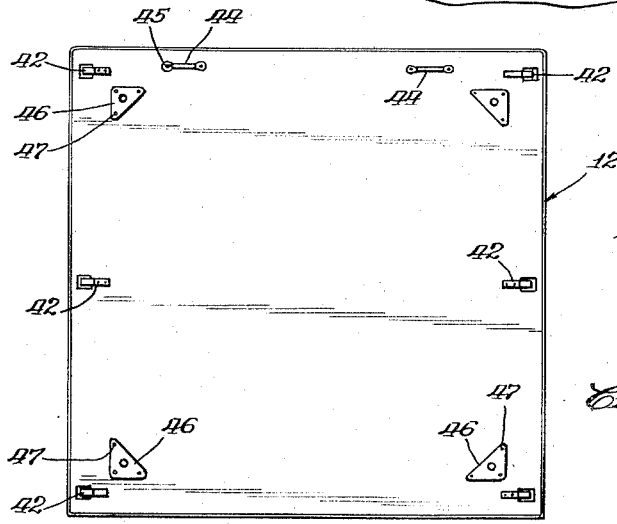
Figure 4 is a bottom plan view of the utility device and showing the under side of a portion of the utility device embodying the invention.

For convenient movement of the center surface 12 as when it is being removed or installed, rollers 41 are provided on the underside of the center surface 12 adjacent to its side edges so that the rollers will rest upon the center supporting portion 32 of the plate 26. As shown in Fig. 4, an aligned series of three rollers are mounted on the underside of opposite edges of the center surface for this purpose. Also mounted on the underside of the center surface 12 are locking arms 42 secured to the body and the center surface by means of wood screws 43. The locking arms are suitably formed so that when assembled they are spaced from the underside of the center surface and adapted to extend under the center supporting portion 32 of the plate 26. The combination of the locking arms 42 and rollers 41 provide an arrangement whereby the portion 32 of the plate is confined between the locking arms and the rollers thereby holding the center surface 12 secure against vertical movement when the automobile is in motion. To further facilitate the removal and installation of the surface 12, handles 44 may be affixed to the underside of the rear edge of the center surface as by wood screws 45.

The protective and supporting surface 12 functions while in the automobile as a combination cover for safety compartment 34 and as a shelf or table for holding articles on top side of the surface 12. In view, however, of the convenience of its removable end installation with respect to the automobile, it may in many instances be used to advantage as a table outside of the automobile, such as, for example, where the automobile has been used as a means of transport for camping, picnicking, and the like. For this purpose, center-threaded leg supports 46 are secured adjacent to each corner of the underside of the surface 12 as by wood screws 47. Table legs (not shown) of proper length and with suitably formed upper ends may be screwed into leg supports 46 after the surface 12 has been removed from the automobile thus converting the surface 12 into a portable table.

The adaptability of the utility device embodying the invention is furthered by making the horizontal dimensions of the center surface 12 at least slightly less than similar dimensions of the automobile floor 33. Thus, where it is desired to remove the surface 12 from its position in assembly with brackets 14 the senter surface may be transported flat on the floor 33 without any interference with the interior space of the automobile although being available for immediate assembly as a combination protective and supporting surface.

As referred to in this description and in the claims appended hereto, the term automobile refers either broadly to an automotive vehicle or more specifically to the present day model or type of automobile commonly referred to as a station wagon. While the utility device embodying the invention could to some extent be used with an automobile other than a station wagon, it has particular application to and unusual advantage with the station wagon in view of the latter's open floor area behind the rear seat bounded laterally by solid wall-like sides under the windows and in the rear by an upwardly swinging window 51 and a downwardly swinging tail gate door 52 through which access may be had to this area. Thus, where the utility device is used with the station wagon, the center surface 12 makes compartment 34 available only when the tailgate 52 is lowered while access may be had to the interior area above the surface 12 by means of the upwardly swinging window 51.

While a preferred embodiment of the invention has been shown and described herein, it will be understood that various changes and modifications may be made therein without departing from the spirit and scope of the invention as defined in the appended claims.

I claim:

1. A utility device for use between the floor and window level area of the interior of an automobile which comprises a bracket affixed to each side of the interior of an automobile below the window level and above the floor level, a rigid, strong, protective and supporting auxiliary surface secured to each of said brackets and projecting inwardly from the sides of the automobile in a plane parallel to the floor, and a rigid, strong, protecting and supporting center surface supported on said brackets and extending between said auxiliary surfaces in the same plane hereof, each of said brackets having an auxiliary supporting portion extending at least partially beneath the auxiliary surface associated therewith and a center supporting portion extending inwardly beyond the inner edge of such auxiliary surface for engagement with and support of an edge of said center surface.

2. A utility device as defined in claim 1 and wherein said center surface has on the under side of each lateral edge a roller and locking arm, said roller projecting from the plane of the under side of said center surface for contact with the upper side of the center supporting portion of each said brackets, and said locking arm being spaced from said roller for extension beneath the center supporting portion of each of said brackets.

3. A utility device as defined in claim 1 and wherein said center surface has gripping means on its underside to facilitate movement of the surface horizontally and has leg supports affixed to its underside adjacent to each corner thereof adapted for threaded engagement with a table leg.

4. A utility device as defined in claim 1 and whereas said center surface is of a width less than at least one lateral dimension of the floor of an automobile to facilitate transport of the center surface when it is in unassembled relationship with the automobile.

References Cited in the file of this patent

UNITED STATES PATENTS

| | | |
|---|---|---|
| 2,226,434 | Hirsh | Dec. 24, 1940 |
| 2,602,499 | Ault | July 8, 1952 |
| 2,767,896 | Beck | Oct. 23, 1956 |
| 2,797,828 | Fritsche | July 2, 1957 |